Nov. 6, 1945.  A. GANIAYRE ET AL  2,388,262
ELECTROMAGNETIC WAVE DIRECTION INDICATOR
Filed April 24, 1942  4 Sheets-Sheet 1
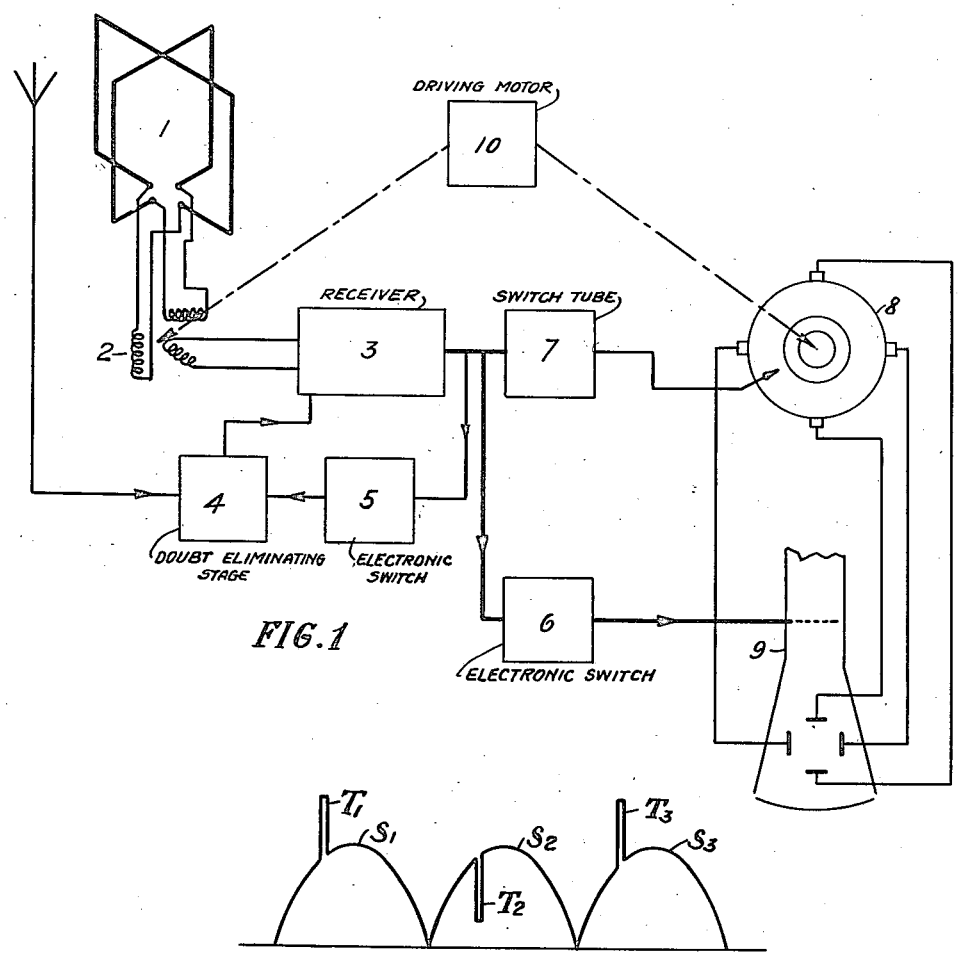
FIG.1
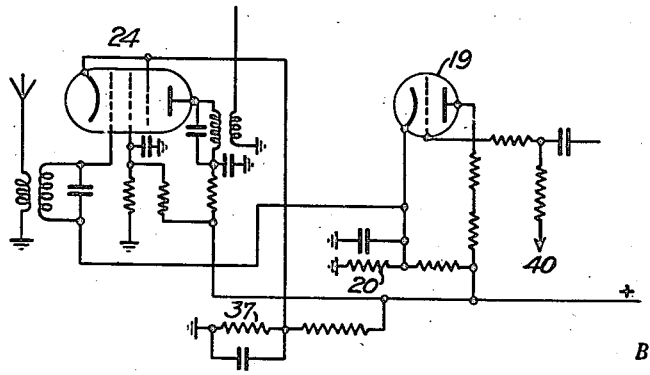
FIG.2
FIG.5
INVENTORS
A. GANIAYRE
R. J. HARDY
BY
ATTORNEY.

Nov. 6, 1945.  A. GANIAYRE ET AL  2,388,262
ELECTROMAGNETIC WAVE DIRECTION INDICATOR
Filed April 24, 1942  4 Sheets-Sheet 3

INVENTORS
A. GANIAYRE
R. J. HARDY
BY
ATTORNEY.

Nov. 6, 1945. A. GANIAYRE ET AL 2,388,262
ELECTROMAGNETIC WAVE DIRECTION INDICATOR
Filed April 24, 1942   4 Sheets-Sheet 4

INVENTORS
A. GANIAYRE
R. J. HARDY
BY
ATTORNEY.

Patented Nov. 6, 1945

2,388,262

UNITED STATES PATENT OFFICE 2,388,262

ELECTROMAGNETIC WAVE DIRECTION INDICATOR

André Ganiayre and René Hardy, Lyon, France; vested in the Alien Property Custodian Application April 24, 1942, Serial No. 440,415
In France July 1, 1941

8 Claims. (Cl. 250—11)

This invention relates to improvements in electromagnetic wave direction indicating systems and particularly to the provision of improved methods and devices for radio direction finding reception without uncertainty as to the direction of the indications obtained. The improvements make possible the automatic suppression of one of the branches of a radiogoniometric image which indicates the line extending through the source of signals, the remaining branch giving the wanted direction without ambiguity as to the lay.

The invention will be explained in detail in the following description given with reference to the appended drawings, in which:

Fig. 1 illustrates schematically one example of a radio direction finding receiver system for automatically eliminating the 180° uncertainty as to the lay of the obtained indications;

Fig. 2 shows a voltage curve used in the circuit of Fig. 1;

Fig. 5 illustrates a modification of the system shown in Fig. 3 in which an amplifier tube is omitted;

Figure 3:
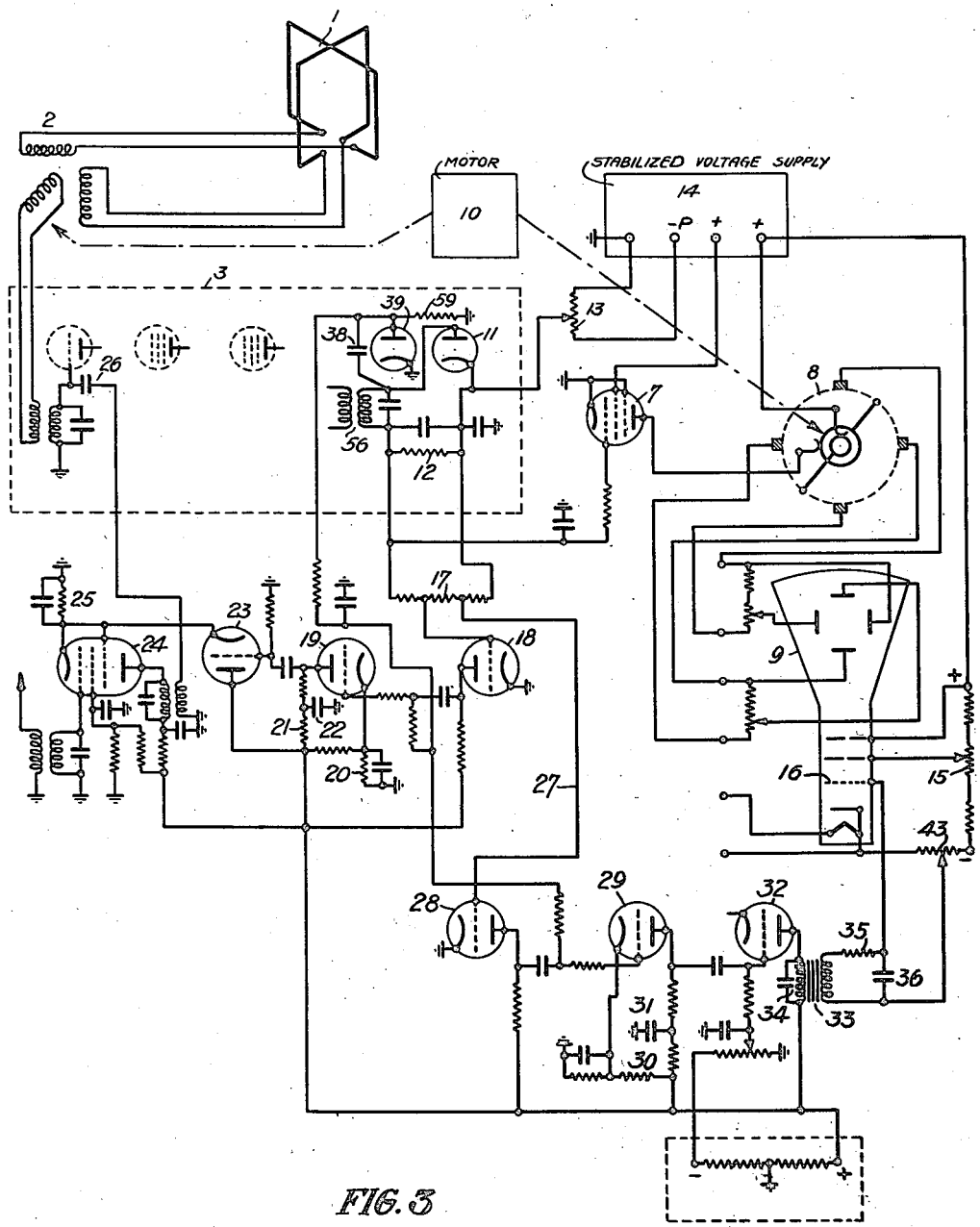
Fig. 3 illustrates in greater detail, according to certain features of the present invention, one example of a radio direction finding receiver system similar as a whole to that of Fig. 1.

First referring to the radio direction finding circuit of Fig. 1, the signal obtained at the output of a finder 2 that is fed by two perpendicular loop aerials or an Adcock antenna system 1 is applied to the first grid of a receiver 3 and rectified at the output of the receiver. This signal is made unsymmetrical by superposition in suitable phase and amplitude at the input of receiver 3 of a brief signal proceeding from a doubt eliminating stage 4. Stage 4 is fed by the central antenna of the wave collector system and is normally blocked and inoperative. Periodically and at the frequency of the rectified signal, it is released for a brief moment by a circuit 5 which is itself controlled by the rectified signal.

At the output of receiver 3 there is obtained a signal whose each semi-sinusoid S1, S2, S3, etc. (Fig. 2) carries a top T1, T2, T3, etc., that is alternately in phase and in phase opposition with the signal proceeding from the finder. This top may be produced when the rectified sinusoid passes to the maxima positions. It is however evident that it may be produced at regular intervals at other moments if its amplitude is given a sufficient value. The top T1, T3, etc., that is in phase is then employed to cause, via suitable circuits 6, the extinction of the luminous indication of the cathode ray tube 9 for a time that corresponds to the formation of the undesired branch of the radiogoniometric image.

The closed circuit current of circuit 7 feeds the rotating distributor 8, e. g. resistance-equipped, which is driven by the motor 10 in synchronism with the finder 2 and forms a radially modulated circle on the cathode ray indicator 9 when a signal is present. On the screen of tube 9 there accordingly would normally appear the well known two-branch radiogoniometric image (Fig. 4C) but one branch of such image will be extinguished, as has been explained, so as to furnish only one branch image (Fig. 4D) without 180° uncertainty as to its lay.

Fig. 3 shows in greater detail a circuit similar to that of Fig. 1.

A wave collector 1 consisting of two perpendicular loop aerials or an Adcock antenna system feeds the two stators of the rotating finder 2 which is driven by a motor 10 at the same speed as a rotating commutator distributor 8.

The rotor of finder 2 acts on the first grid of a receiver 3. This receiver may be of the direct amplification type or of the frequency changing type.

The received signal is rectified at the output of receiver 3 by a diode 11 that comprises a loading resistance 12.

The cathode of tube 11 is not connected to earth but by means of a potentiometer 13 to a negative bias taken from a stabilized feed rectifier block 14 which simultaneously furnishes the plate voltage supply of tube 7 via the rotating distributor 8. The highest voltage point of the rectifier block 14 is connected direct to the corresponding point of the voltage supply 15 of the cathode ray tube 9 which is provided with a control grid 16. When there is no signal, the plate current of tube 7 produces between the two pairs of brushes of the rotating distributor 8 two substantially sinusoidal voltages displaced in phase from each other by 90°.

These two voltages are applied to the two pairs of deflection plates of the oscillograph 9 and, as is well known, their 90° phase displacements produce a luminous circle on the screen of tube 9.

Figure 4A:
Figs. 4A, 4B, 4C and 4D show various curves used in the explanation of the operation of the circuits of Figs. 1 and 3.
Figure 4B:
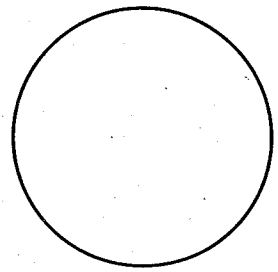
Figure 4C:

If the control grid of tube 7 is energized by the signal having the shape of two juxtaposed semi-sinusoids that proceeds from diode 11, the luminous circle that is visible on the screen of tube 9 will become modulated by the plate current variations of tube 7 and will assume the shape of the classic radiogoniometric image (Fig. 4C).

The means employed for effecting the disappearance of the non-desired branch of this image will now be described in accordance with one embodiment.

In parallel on the loading resistance 12 of diode 11 there is a voltage divider 17 which feeds two quite distinct paths.

As regards the first path, the voltage divider 17 feeds the control grid of tube 18 whose plate circuit amplifies and transmits to the grid of a thyratron 19 the signal that exists at the terminals of resistance 12.

When there is no signal, the thyratron is blocked, since its cathode is brought by the voltage drop in resistance 20 to a positive value that is sufficiently high to make discharge impossible. In other words, the grid of thyratron 19 is brought to a negative potential that prevents discharge.

On appearance of the signal, this grid is brought to a positive potential that varies with the shape of the signal and at each semi-sinusoid the signal attains at a given moment a value that is sufficient for releasing thyratron 19 which discharges at a quite definite frequency, namely that of the maxima of the signal, this frequency being furthermore controlled by the relaxation circuit 21—22 inserted in the connection that joins the plate of thyratron 19 to the high voltage.

The discharge of thyratron 19 causes an abrupt voltage drop in its plate. This top of negative sign brings for a very brief moment the grid of tube 23 to a considerable negative potential that suppresses the plate current of tube 23 and releases for an equally short space of time the doubt eliminating tube 24 which is normally blocked by the high negative voltage that exists between its grid and its cathode as a result of the passage into resistance 25 of the total of the plate currents of tubes 23 and 24.

The doubt eliminating tube 24 receives on its grid, after suitable phase displacement, the signal picked up by the antenna that is associated with the wave collector. At the output of the doubt eliminating stage, this amplified signal is superposed by means of condenser 26 on the signal proceeding from the finder and picked up by the first grid of receiver 3.

Since the doubt eliminating tube 24, as described above, only operates for a very short time, the doubt eliminating signal transmitted by condenser 26 to the input of receiver 3 will also be very short, its superposition on the signal proceeding from the finder will finally furnish, after rectification in the diode tube 11, a signal like the one shown in Fig. 2.

As regards the second path fed by voltage divider 17, the connection 27 joins the voltage divider 17 to the first grid of the second path in tube 28.

This tube 28 operates under the same conditions as tube 18 and, like the latter tube, it acts on the grid of a thyratron 29 that is installed similarly to thyratron 19, i. e. blocked when there is no signal but disposed so as to operate at a frequency that is half of the frequency of thyratron 19.

The signal obtainable on the voltage divided 17 has the shape shown in Fig. 2, but whereas thyratron 19 is controlled by the signal of juxtaposed semi-sinusoids shape, the thyratron 29 will be released by the top T1, T3, etc. which extend beyond the maxima of the signal, the relaxation circuit 30—31 of the thyratron 29 being adjusted to the frequencies of the tops outside of the curve of the signal, i. e. to a frequency half that at which the semi-sinusoids S1, S2, etc., succeed each other.

The discharge of thyratron 29, which causes an abrupt voltage drop of great amplitude on its plate, is transmitted to the grid of a tube 32, this grid being negatively biased at such a value that the plate current of tube 32 does not exceed in the resting condition the maximum value permissible for the safety of the tube.

The plate circuit of tube 32 contains the primary winding of an air-gap transformer 33 shunted by a condenser 34. The secondary winding of this transformer is closed on a resistance-capacity assembly 35—36. The discharge top of thyratron 29 abruptly energizes the grid of tube 32, on the plate of which the same signal is found amplified and in more expanded shape on account of the time constant of the plate circuit. In the secondary of transformer 33, the same signal is again found in the same but more expanded shape at the terminals of condenser 36.

If the windings are made in a suitable way, it will be seen that upon each discharge of thyratron 29 the grid 16 of the cathode ray tube 9 is made negative for a time that depends on the characteristics of the output circuit of tube 32. When grid 16 becomes sufficiently negative, the intensity of the cathode beam will become so low that no trace will be visible on the screen during the time mentioned above.

It is accordingly possible by means of the circuit of Figure 3 to prevent the appearance on the screen of the undesired branch of the radiogoniometric image.

Fig. 4B shows the circle obtained on the cathode ray tube screen by means of the rotary commutator distributor 8. This circle actually consists of a series of dots which cannot be perfectly regular on account of faulty contact of the brushes that wipe against the numerous segments of the rotary commutator. Its regularity may however be improved by several well-known methods. When, on the other hand, instead of distributor 8, use is made of a magnetic deflection coil that rotates around the neck of the cathode ray tube, any defect in the circle is removed but the space occupied by the system is much greater.

Figure 4D:

Fig. 4C shows the two-branch radiogoniometric image while Fig. 4D shows the extinction of the undesired branch that is obtained with a circuit like the one shown in Fig. 3.

Fig. 4A shows the shape of the signal that is obtained at the terminals of condenser 36 and is applied to the grid 16 of the indicating tube 9. The variation of the amplitude of this signal causes of course a variation of the time taken to extinguish the cathode spot of tube 9, this time being adjusted by changing the circuit characteristics of tube 32.

Another modification of the circuit, which is shown in Fig. 5, consists in omitting tube 23 that serves as blocking intermediary between the thyratron 19 and the doubt eliminating tube 24. The grid back coupling of tube 24 is no longer to earth but to the cathode of the thyratron, as shown in the drawings, and this brings the grid of tube 24 to a certain positive potential when there is no incoming signal.

Resistance 37 is dimensioned in such a way that the cathode of tube 24 is brought to a positive potential that is greater, e. g. by about ten volts, than that of the grid of tube 24. This grid is accordingly negative with respect to its cathode by about ten volts and this prevents tube 24 from operating.

When a signal appears, thyratron 19 comes into operation and at each of its discharges there appears on its cathode a positive top which is due to the abrupt increase in the voltage drop at the terminals of resistance 29'. This positive top is transmitted to the grid of tube 24, thus diminishing its negative polarity with respect to the cathode and permitting for a brief moment the normal operation of the doubt eliminating stage 24.

Figure 6:
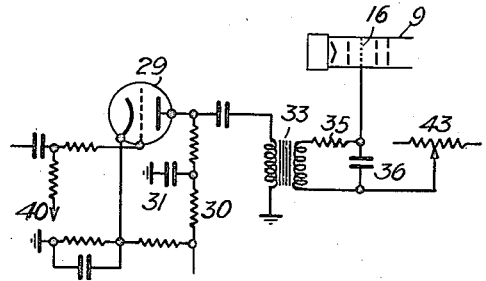
Fig. 6 illustrates a similar modification omitting another amplifier tube.

Another modification, which is shown in Fig. 6, consists in omitting tube 32 and, as shown, having thyratron 29 act direct on the time constant circuit 35—36 via transformer 33.

No matter which connection arrangement is used, a difficulty arises when it is attempted to keep the circuit operating correctly for input signals of variable intensity. The limits of the variations of intensity of the signal may be taken to be such values that the radiogoniometric image will stay between two extreme shapes on the screen of the cathode ray tube indicator, thus making it possible to locate the wanted transmitter with sufficient precision.

The abovementioned difficulty is chiefly due to the fact that a thyratron only operates in a stable manner for synchronization voltages within certain limits of amplitude. It is evident that if the grid signal is too weak, the synchronization will be very poor or will not occur at all. If, on the other hand, the grid signal is too strong, the grid of the thyratron becomes positive with respect to its cathode and the discharge frequency of the thyratron no longer follows the frequency of the signal nor the frequency of the relaxation circuit either.

Regulation of the operation may be obtained by effecting the back coupling of the grids of the thyratrons 19 and 29 at a point of negative potential having a value that varies depending on the intensity of the signal. For this purpose, the means frequency circuit that feeds diode 11 is connected by a condenser 38 (Fig. 3) to a second diode 39 the plate circuit of which comprises a loading resistance 59. The rectified mean current produces on the plate of diode 39 a negative potential having an intensity that increases in absolute value with that of the signal. As a result of this, the grids of the thyratrons 19 and 29 are all the more negative according as the input signal is stronger, and this automatically prevents them from becoming positive, at least within the limits defined above.

Figure 7:
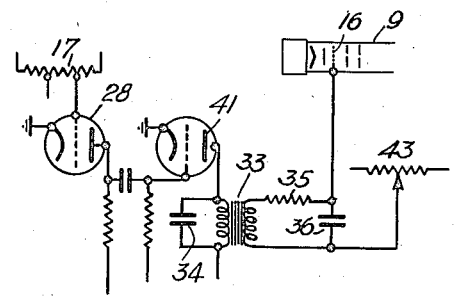
Fig. 7 shows another modification in which a triode is substituted for a glow discharge tube.

Another variant of the circuit of Fig. 3 consists in the replacement of the discharge tube 29 by an ordinary triode or other tube 41. A circuit arrangement of this kind is shown in Fig. 7. The top that acts on the time constant circuit 35—36 is then none other than the top outside of the signal curve proceeding from the diode 11, this top being amplified by tube 28 and applied to the grid of tube 41.

There is a drawback in the use of a triode 41 owing to the fact that the amplitude of the time constant signal obtained at the terminals of condenser 36 is a function of the signal applied to the grid of tube 41. It would accordingly be necessary to effect an automatic control of the strict volume that would make it possible, at the cost of one or two additional tubes, to retain a signal of constant amplitude at the terminals of condenser 36. If, on the other hand, use is made of the thyratron 29, the signal applied to the time constant circuit 35—36 retains an invariable amplitude as long as the synchronization is strict owing to the fact that thyratron 29 acts the part of a relay.

Figure 8:
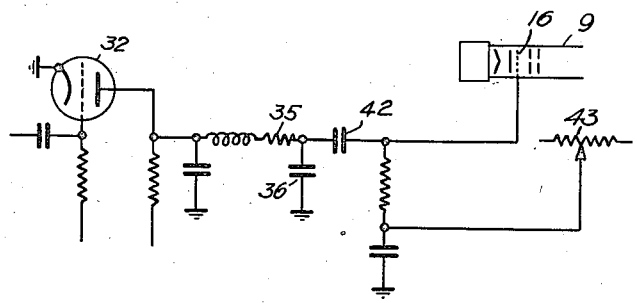
Fig. 8 is a further modification indicating a change in a coupling arrangement.

The part played by tube 7 of the circuit of Fig. 3 is that of modulating the circle produced on the indicator and consequently the point of highest potential of the power supply 15 of the cathode ray tube 9. The supply sources 14 and 15 consequently cannot have a common earth and this necessitates connections by condenser or by transformer. The connection between the tube 32 and grid 16 of the cathode ray tube 9 is effected by the air-gap transformer 33. A variant of the connection arrangement, shown in Fig. 8, effects the connection by means of a capacity 42.

In both cases the mean potential of grid 16 cannot be stable and it will depend on the amplitude of the signal proceeding from tube 32 on account of the asymmetrical shape of this signal. This instability of the mean potential is shown on the screen of cathode ray tube 9 by an abrupt variation of the brilliancy of the image upon passing from the two-branch image to the one-branch image. In order to avoid this drawback, the circuit of Fig. 3 may be modified in the following way.

Figure 9:
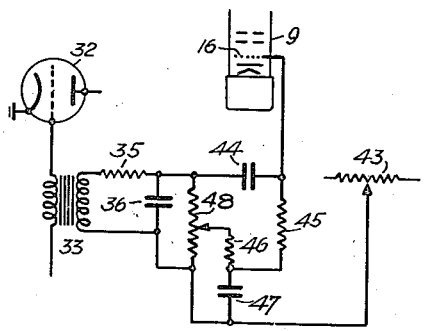
Fig. 9 is a modification of said system in which the cathode ray tube grid is not utilized.
Figure 10:
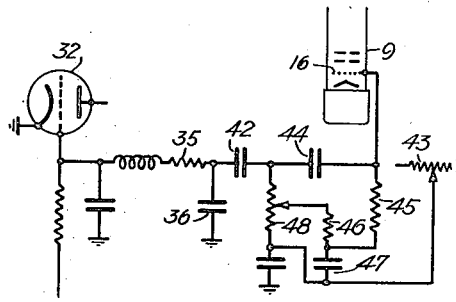
Fig. 10 shows a modification similar to that of Fig. 9 but with another type of coupling.

Since the presence of an asymmetrical signal results in the production of a load that creates a bias of the grid 16 of tube 9, this self-polarization can be compensated by merely introducing a voltage of the same size in the reverse direction. Figs. 9 and 10 are examples showing two connection circuits that fulfill this condition in the cases of connection by transformer and capacity respectively. These two figures comprise two resistance-capacity networks 44—45 and 46—47. Network 44—45 effects the transfer of the energy from one stage to the other, since the value of the time constant 44—45 is great with respect to the period of the wave of the output current of tube 32. Network 46—47 compensates the undesirable self-polarization voltage by producing a voltage of the same value as that created in circuit 44—45. Accordingly, the values of the elements 46—47 will be the same as the values of the elements 44—45, as the return point of resistance 45 is connected to the junction point between resistance 46 and condenser 47. When the modulation becomes greater, the counter-polarization furnished by the network 46—47 will also become greater automatically and will counteract the self-polarization of the grid without thereby affecting the shape of the transmitted signal. Furthermore, a potentiometer 48 permits regulation of the degree of counter-polarization.

In the above description, the extinction of the undesired branch of the radiogoniometric image has been obtained by acting on the control grid 16 of the cathode ray tube 9.

However, all cathode ray tubes are not equipped with this electrode and even when they are provided with it there may be certain cases when it is impossible to make any changes in the control circuits. The circuit diagram shown in Fig. 11 makes it possible to extinguish the spot at any desired moment, not by acting on the grid of the cathode ray tube but on the control circuit of the modulation stage. Use can then be made of any cathode ray tube, since the modulation tube is merely blocked during the period that corresponds to the generation of the undesired branch of the radiogoniometric image.

Figure 11:
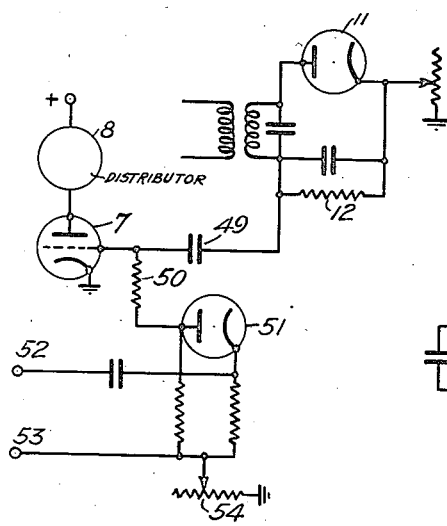
Fig. 11 shows a partial modification of the circuit of Fig. 3 for adapting it to an indicating cathode ray tube that has no control grid.

As shown in Fig. 11, the signal rectified by diode 11 is transmitted by means of condenser 49 to the grid of the modulation tube 7. The grid resistance 50 is connected to the plate of a diode 51.

The time constant negative signal proceeding from transformer 33 (Fig. 3) is applied to the terminals 52, 53 (Fig. 11). When this signal does not appear, the grid of the modulation tube 7 is at the biasing potential determined by the potentiometer 54 (13 in Fig. 3). When the time constant signal appears, the cathode of diode 51 becomes negative and, for the entire duration of this signal, the plate of diode 51 becomes negative with respect to the biasing potential on resistance 54, and this blocks operation of the modulation tube 7.

The undesired branch of the image is accordingly not traced on the screen of the cathode ray tube, and the spot remains at the center of the screen as long a time as desired.

In the circuit diagram of Fig. 11, the time constant signal applied to the grid of modulation tube 7 reacts on the grids of tubes 18 and 28 of the general circuit of Fig. 3. Depending on the shape of the time constant signal, this reaction may cause irregularities in the operation of the discharge tube or tubes belonging to the two paths controlled by the tubes 18 and 28.

Figure 12:
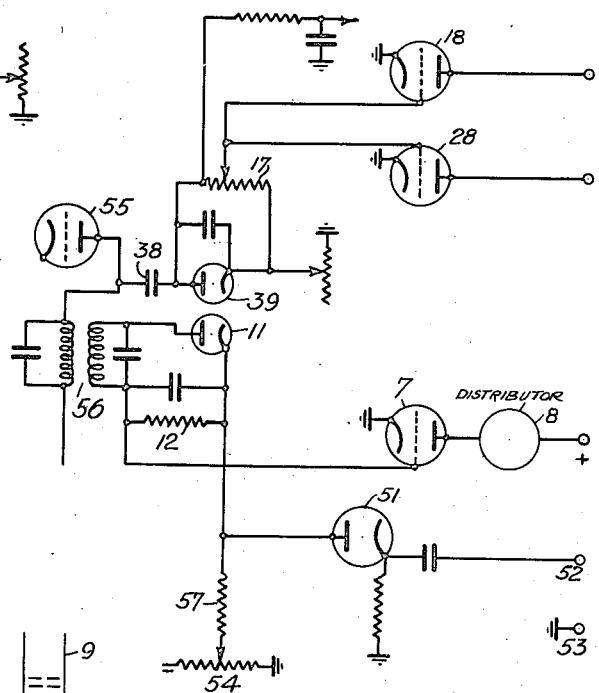
Fig. 12 shows a modification of the circuit of Fig. 10.

A variant connection arrangement that makes it possible to suppress this reaction is shown in the diagram of Fig. 12. Tube 55, which is the last tube of the receiver's intermediate frequency amplifier, controls the two diodes 11 and 39. Diode 11 is connected to the secondary circuit of the tuned transformer 56, and at the terminals of loading resistance 12 there is developed the signal that is applied to the grid of modulation tube 7 whose plate circuit contains the rotary commutator distributor 8. The cathode of diode 11 is connected to the biasing potentiometer 54 by means of a resistance 57.

Diode 51 receives the negative time constant signal that is applied between the terminals 52 and 53.

Upon each appearance of this signal, the grid of tube 7, which is normally at the potential defined by the biassing potentiometer 54, is abruptly brought to a negative potential that suppresses for the entire duration of the time constant signal the current that exists in distributor 8. Since the cathode ray tube is no longer controlled, the spot remains at the center of the screen for the corresponding time, and the undesired branch of the image does not appear.

Furthermore, diode 39, which is controlled via condenser 38 by the plate circuit of tube 55, feeds the grids of tubes 18 and 28 (Fig. 3) which are the two initial tubes of the two paths described above.

Diode 39 also supplies the regulation or automatic volume control voltage. The two paths in which tubes 18 and 28 are comprised are then liberated from any reaction proceeding from the circuit of diode 11 because the arrangement of Fig. 12 insures complete independence of the modulation tube 7 and of the time constant signal circuit.

The time constant signal obtained by the abovementioned means has the shape shown in Fig. 4A. This rounded shape is not entirely satisfactory because it does not cause the abrupt occurrence of the desired phenomenon (extinction of the spot by the cathode ray tube's control grid or blocking of the modulation tube). In other words, if precautions are not taken for giving the signal a suitable phase and duration, the radiogoniometric image is apt to extinguish gradually or to become improperly distorted.

These difficulties would be eliminated if the time constant signal were of square shape. The rounded signal of Fig. 4A can be transformed into a square signal in the following way.

Figure 13:
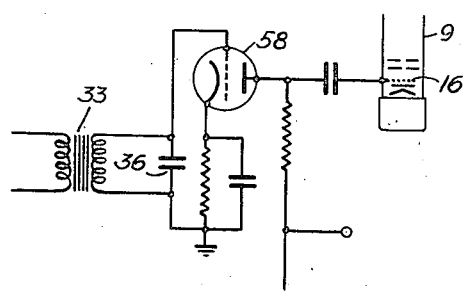
Fig. 13 shows a modification of the time constant circuit of Fig. 12.

The time constant signal is applied to the grid of a discharge tube 58 (Fig. 13) operating as a relay without relaxation circuit. This discharge tube is normally blocked by the bias given to its cathode. If the grid is energized by the time constant signal applied in a suitable way, the thyratron will discharge as soon as its grid has reached a sufficiently positive value and it continues to discharge at constant intensity as long as the amplitude of the signal holds up above this value whereupon the discharge stops abruptly until a new signal appears on the grid. This results in the production of a square signal having a duration that depends on the amplitude of the grid signal.

It is evident that the present invention is not limited to the examples of embodiments shown and described but that, on the contrary, it is capable of numerous modifications and adaptations without departing from its scope.

We claim:

1. A direction finder comprising a cathode ray oscilloscope, a signal receiving system including means for rectifying an incoming signal wave and means controlled by said rectified wave for producing on said oscilloscope an image indicating the line of direction of the signal; and means for suppressing a portion of the image to indicate the directional lay, comprising means controlled by the pulsations of said rectified wave for generating voltage peaks in synchronism with and exceeding alternate pulsation voltages, a second means for generating voltage peaks actuated by and in synchronism with said former voltage peaks, and means actuated by said second voltage peaks for alternately impressing and suppressing successive portions of said image in synchronism with said second peaks.

2. A direction finder as set forth in claim 1, in which the means for generating the second voltage peaks comprises a glow discharge tube.

3. A direction finder as set forth in claim 1, in which the means for generating the second voltage peaks comprises a glow discharge tube, and which includes means for varying the negative potential on the grid of said tube in accordance with variations in signal amplitude, arranged to maintain uniform tube discharge conditions with signals of varying strength.

4. A direction finder as set forth in claim 1, in which the image suppression is controlled by applying the second peak voltages to the oscilloscope grid.

5. A direction finder as set forth in claim 1, in which the image suppression is controlled by applying the second peak voltages to the oscilloscope grid, and which includes a counter-biasing network in the grid input circuit.

6. A direction finder as set forth in claim 1, in which the image producing means includes a modulation tube connected to the oscilloscope beam deflecting construction, and the second peak voltages are applied to the grid of said modulation tube and produce intermittent operation thereof.

7. A direction finder comprising a directional antenna system, a receiver having its input connected to said antenna system, means for cyclically orientating said antenna system whereby the output of said receiver caused by a signal received from a transmitting station, the direction of which is to be found, will vary cyclically, a non-directional antenna, means for connecting said non-directional antenna to said input of said receiver for a small portion only of each cyclical peak of receiver output, an indicating device, means to utilize the output of said receiver to produce an indication on said indicating device of peak output of said receiver synchronized in direction with the orientation of said directional antenna, and means controlled by the phase relation of the signals from the directional antenna system and the non-directional antenna to prevent alternate peaks of receiver output from producing an indication on said indicating device.

8. A direction finder as set forth in claim 7, in which the indicating device is a cathode ray tube and the receiver output controls the density of the electron beam thereof.

ANDRÉ GANIAYRE.
RENÉ HARDY.